United States Patent
Wu et al.

(10) Patent No.: US 8,718,035 B2
(45) Date of Patent: May 6, 2014

(54) METHOD AND DEVICE FOR REALIZING GROUPING IN MULTI-INPUT MULTI-OUTPUT TRANSMISSION WITH MULTIPLE-SECTOR COORDINATION

(75) Inventors: Keying Wu, Shanghai (CN); Yang Song, Shanghai (CN); Liyu Cai, Shanghai (CN); Dong Li, Shanghai (CN)

(73) Assignee: Alcatel Lucent, Paris (FR)

( * ) Notice: Subject to any disclaimer, the term of this patent is extended or adjusted under 35 U.S.C. 154(b) by 244 days.

(21) Appl. No.: 13/059,701

(22) PCT Filed: Aug. 18, 2008

(86) PCT No.: PCT/CN2008/001480
§ 371 (c)(1),
(2), (4) Date: Feb. 18, 2011

(87) PCT Pub. No.: WO2010/020063
PCT Pub. Date: Feb. 25, 2010

(65) Prior Publication Data
US 2011/0142164 A1    Jun. 16, 2011

(51) Int. Cl.
*H04J 1/00* (2006.01)
(52) U.S. Cl.
USPC .......................... 370/343; 375/295; 455/447
(58) Field of Classification Search
USPC ............... 370/210, 312, 328–338, 343–344, 370/345–350; 375/267, 509; 455/447, 509
See application file for complete search history.

(56) References Cited

U.S. PATENT DOCUMENTS

| | | | |
|---|---|---|---|
| 7,424,298 B2* | 9/2008 | Lastinger et al. | 455/447 |
| 8,265,675 B2* | 9/2012 | Matsumoto et al. | 455/509 |
| 2007/0081448 A1 | 4/2007 | Ahmed et al. | |
| 2008/0192682 A1 | 8/2008 | Matsumoto et al. | |
| 2009/0016461 A1* | 1/2009 | Jitsukawa et al. | 375/267 |
| 2009/0316675 A1* | 12/2009 | Malladi et al. | 370/343 |

FOREIGN PATENT DOCUMENTS

| | | |
|---|---|---|
| CN | 1878022 A | 12/2006 |
| CN | 101150868 A | 3/2008 |
| WO | WO2007/043459 A1 | 4/2007 |
| WO | WO2008/033802 A2 | 3/2008 |

OTHER PUBLICATIONS

International Search Report for PCT/CN2008/001480 dated Apr. 30, 2009.
European Search Report, EP Appl. No. 08783654.0/1855/2317669 PCT/CN2008001480, Dated Oct. 4, 2013, Completed Sep. 26, 2013, The Hague.

* cited by examiner

*Primary Examiner* — Ricky Ngo
*Assistant Examiner* — Iqbal Zaidi
(74) *Attorney, Agent, or Firm* — Fay Sharpe LLP

(57) ABSTRACT

A method and device for performing Multi-Input Multi-Output transmission to a mobile terminal in the base station devices of a wireless communication system is provided. Each base station device determines the sector coordination group used at a certain frequency band according to system settings. Each base station device only performs multiple-sector (-cell) collaborative MIMO transmission in the sector coordination group which includes the sectors governed by the base station device. A simple and effective method is provided for realizing the multiple-sector (-cell) MIMO technology, its advantages including but not limited to there being a reduced amount of information exchanged between sectors (cells), which facilitates implementation and management, and good performance in controlling interface between sectors (cells).

20 Claims, 4 Drawing Sheets

METHOD AND DEVICE FOR REALIZING GROUPING IN MULTI-INPUT MULTI-OUTPUT TRANSMISSION WITH MULTIPLE-SECTOR COORDINATION

TECHNICAL FIELD

The present invention is pertinent to the technology of Multiple-Input Multiple-Output (MIMO), particularly to the technology of multiple-sector cooperation.

BACKGROUND

To improve the user capacity of system, a low frequency reuse actor is often adopted in the prior wireless communication system, namely, all cells share a same time frequency resource, while the inter-cell interference (ICI) caused by low frequency reuse factor is an important factor in restricting the downlink capacity. For an mobile station (MS) located in cell-edge (i.e. the area between neighboring cells), while receiving a useful signal from the base to which the MS belongs, the MS still receives signals via the same time/frequency from other Base stations (BS), which forms a interference to the MS.

In the prior wireless communication system, there exists the following several solutions for the above problem:

1. Fractional Frequency Reuse

On the basis of the solution of Fractional Frequency Reuse, the user in the central area of the cell is permitted to work with all available sub-channels, while the user in the cell-edge are is only permitted to work with a portion of all the available sub-channels, wherein the assignment of the sub-channels should ensure that different sub-channel group is assigned to the edge area of neighboring cells. The technology of fractional frequency reuse maximizes the spectral efficiency of the central area of cells and improves signal quality of users in cell-edge.

2. Macro-Diversity

On the basis of the solution of macro-diversity, for the MS moving over to cell-edge, the BS to which the MS belongs to and the BS to which the MS is moving over send the same signal to the MS via the same time/frequency (slot and subcarrier). Thus, ICI of neighboring cells is restricted, and diversity gain can be obtained for the received signal of the MS due to the independence of transmission channel among the BSs.

For the improvement of performance of users in the cell-edge without loss (or even with improvement) of total throughput of cells, applicant of the present intention propose a technology of multiple BS MIMO. As a portion of such technology of multiple BS MIMO, applicant of the present invention submit a technical proposal to broadband wireless access working group of IEEE802.16 on May 5, 2008, and the number of the proposal is IEEE C802.16m-08/423, of which the name is "Multiple Base Station MIMO". The proposal is incorporated entirely herein by reference.

The basic concept of such technology of multiple BS MIMO is the collaborative MIMO transmission and receiving between multiple BSs and one or more MSs via the sane wireless resource. Such technology is with basic property of two aspects:

1) With the coordination of BS, multiple BSs jointly serve for the same MS via the same time frequency.

2) each BS may serve multiple MSs via the same time/frequency.

Multiple BS MIMO includes basic operations of the following three aspects:

1) each BS acquires the channel information of all MSs for which it serves. Channel information may be acquired in the following different fashions:

i. for TDD Downlink, estimation of Uplink is applicable to Downlink transmission.

ii. for FDD Downlink, channel information may be acquired by feedback of MS.

2) Information exchange is necessary for coordination of BS. And the manners to implement information exchange may be as follows:

i. whole information exchange: every BS needs to share all the channel information between the BS and MSs that the BS possibly may serve for, for instance short-time channel matrix.

ii. Partial information exchange: every BS merely needs to share portion of the channel information between the BS and MSs that the BS possibly may serve for, for instance, long-time channel quality indicator (CQI), Received Signal Strength Indication (RSSI) and measurement of preamble of other downlink or covariance channel matrix.

iii. Schedule information (for instance time, frequency, transmission format and so on) may have to be shared between BSs.

3) base on the information acquired by the procedure 1), 2), multiple BS transmission is conducted via the Downlink of MSs served jointly.

Previously, on Aug. 29, 2007, applicant of the present invention submitted a technical proposal, numbered IEEE C802.16m-07/16, to the broadband wireless access working group of IEEE802.16, of which the title is "Collaborative MIMO Based on Multiple Base Station Coordination". The proposal discloses a relatively specific technical solution of multiple BS MIMO, briefly referred to as Co-MIMO. The proposal is incorporated entirely herein by reference. The proposal discloses an exemplary Co-MIMO system architecture: multiple cooperative BSs are connected to a scheduling device via Backbone network, and each BS comprises a device for generating pre-coding matrix so as to compute the pre coding matrix thereof to perform the Space Division Multiple Access (SDMA). Following steps will be performed on BS side:

1) each BS reports some channel information, between the MS and itself, to the scheduling device via Backbone network, for example Received Signal Strength Indication (RSSI) or channel quality indicator (CQI).

2) the scheduling device determines serving relationship between every BS and every MS, and send the schedule decision to every cooperative BS. A device for dispatching user data service dispatches user data stream to the corresponding BS according to the scheduling decision. Wherein, di represents the user data stream to be transmitted by the base station BSi.

3) According to the scheduling decision, the base station BSi estimates the channel status information (CSI) Hi between itself and the MS served by itself. And then, the device for generating pre-coding matrix of the base station BSi independently compute the pre-coding matrix Wi thereof according to Hi, thereby carrying out beamforming or the technology of multiple user MIMO.

Herein, all those MIMO technologies capable of implementing the following two points are commonly referred to as multiple BS MIMO technology:

1) by the coordination of BS, multiple BSs may jointly serve the same MS via the same time/frequency.

2) every BS may serve multiple MSs via the same time/frequency.

Currently, more investigation should go on with the problem that which BS Group should be coordinated to conduct the collaborative MIMO transmission in the multiple BS MIMO.

SUMMARY OF THE INVENTION

Part of the concepts, items in the present invention are defined as follows:

cell: generally refers to one mesh in the cellular network structure.

sector: generally refers to sector-shaped service area in the coverage of the signal from one antenna and feeding system group within a cell, and one sector is an independent logical network entity. If omnidirectional antenna is adopted, one cell may contain one sector only; and if directional antenna adopted, one cell may contain multiple sectors.

BS device: Physical network entity with which every sector is configured and to which every sector corresponds to. BS device may comprise portion of, entire one or more than one practical device (for instance one BS rack). For instance, there may be provided 12 frequency points for one practical device, while it is necessary for three BS devices to provide 6, 12, or 18 frequency points respectively, then such three devices comprises respectively portion of, one or more than one practical device. Normally, in order to have one cell configured with one BS, correspondingly, if omnidirectional antenna is adopted, a BS may comprise one BS only; if directional antenna adopted, a BS may comprise multiple BSs.

According to the above definitions, the technology of multiple-BS MIMO described foregoing can be recited as the technology of multiple-sector MIMO. And the technology of multiple-sector MIMO herein has the following properties: 1) by the coordination of BS, multiple BSs may jointly serve the same MS via the same time/frequency; 2) every BS may serve multiple MSs via the same time/frequency.

Some consideration is taken, in the present invention, for the basic problem of feasibility of the technology of multiple-sector: grouping of collaborative sector. The basic idea of multiple-sector MIMO is to conduct the MIMO transmission by multiple sectors via coordination. Theoretically, gain of joint MIMO transmission improves as the number of collaborative sectors increases. However, numerous collaborative sectors will lead to a sharp increment of the communication and signaling overhead among the cells, thus, it is relatively feasible to restrict the number of the collaborative sectors to obtain a reasonable overhead in the practical application. One main objective of the present invention lies in determining which sectors is due to conduct the joint MIMO transmission service.

According to the first aspect of the present invention, there is provided a method for implementing MIMO transmission in a base station device of a wireless communication system, wherein each cell of said wireless communication system comprises one or more sectors, each of which is configured with one base station device, and the method comprises steps of: a). determining a first sector cooperation group used by said base station device in a first frequency band, wherein said first sector cooperation group comprises the sector dominated by said base station device and one or more adjacent sectors of said sector; b. implementing MIMO transmission in said first frequency band, by cooperating with adjacent base station devices configured for said one or more adjacent sectors of said first sector cooperation group for a mobile station in signal overlapping coverage area of each sector of said first sector cooperation group.

According to a second aspect of the present invention, there is provided an access implementation apparatus for implementing MIMO transmission to a mobile station in a base station device of a wireless communication system, wherein each cell of said wireless communication system comprises one or more sector, each of which is configured with one base station device, the access implementation apparatus comprises: a sector cooperation group determining means, for determining a first sector cooperation group used by said base station device in a first frequency band, wherein said first sector cooperation group comprises the sector dominated by said base station device and one or more adjacent sectors of said sector; and a signal transmission implementing means, for implementing MIMO transmission in said first frequency band, by cooperating with adjacent base station devices configured to said one or more adjacent sectors of said first sector cooperation group, for a mobile station in signal overlapping coverage area of each sector of said first sector cooperation group.

Technical solution in the present invention comprises but not limited to the following merits:

1. sectors (cells) have less amount of information to exchange thereamong, thus being convenient for implementation and administration.

2. good performance in resistance for inter-sector (cell) interference.

BRIEF DESCRIPTION OF THE DRAWINGS

Features, aspects and advantages of the present invention will become more obvious by reading the following description of non-limiting embodiments with the aid of appended drawings.

wherein, same or similar reference numerals refer to the same or similar device (module) or step of method.

DETAILED DESCRIPTION OF EMBODIMENTS

Figure 1A:
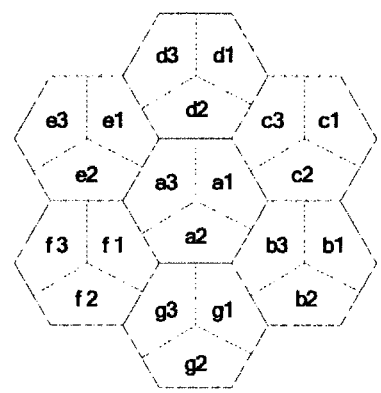
FIG. 1a, 1b illustrates respectively a sector-division topology in a cellular communication network.
Figure 1B:
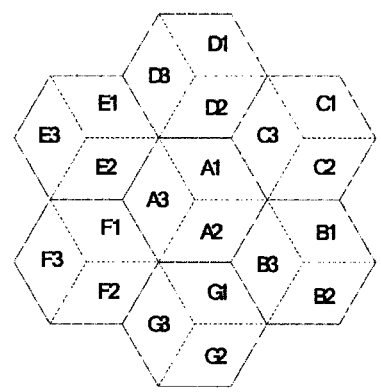

FIG. 1a, 1b illustrates respectively a sector division topology in a cellular communication network. As shown in FIG. 1a, every cell is divided into three sectors, for instance cell a is divided into sector a1, a2, a3. In the sector-division topology structure shown in FIG. 1a, one sector is configured to be with 6 adjacent sectors, for example, adjacent sectors of sector a1 comprises: sector b3, c2, c3, d2, a2, a3. As shown in FIG. 1b, every cell is divided into 3 sectors, for instance cell A is divided into sector A1, A2, A3. In the structure of sector division topology shown in FIG. 1b, those adjacent sectors of sector A1 comprises: sector C3, D2, A2, A3. It should be appreciated that, the illustrated network may be a WiMAX network, 3G network or next generation wireless mobile communication network, but not limited thereto.

Figure 2:
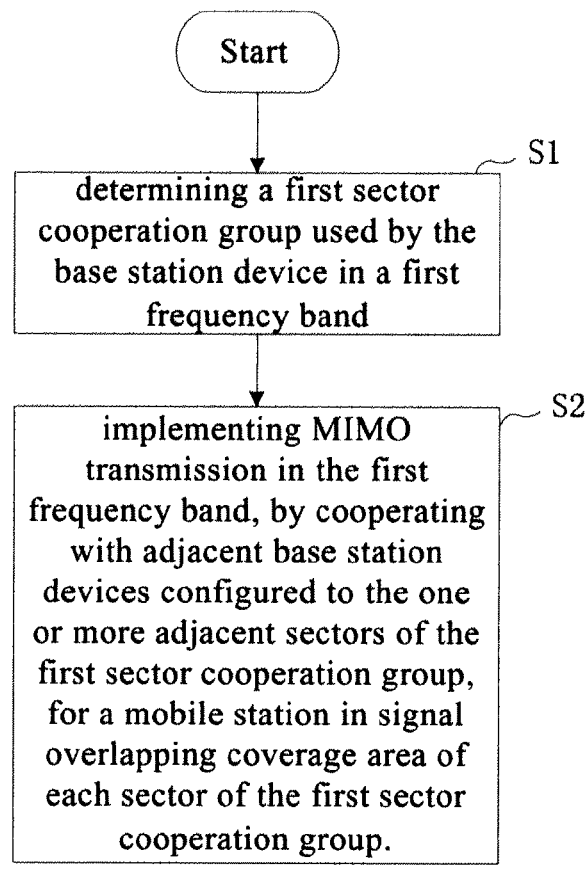
FIG. 2 illustrates the flow chart of method for implementing MIMO transmission in a base station device of a wireless communication system according to an embodiment of the present invention.

According to a first aspect of the present invention, there is provided a method for implementing MIMO transmission in a base station device of a wireless communication system. And as shown in FIG. 2, there is provided a flow chart of method for implementing MIMO transmission in a base station device of a wireless communication system according to one embodiment of the present invention.

According to one embodiment of the present invention, a sector-division structure of FIG. 1a is adopted in wireless communication system. Every cell comprises three sectors, and every sector is configured with a BS device. For a convenient explanation, BS device, with which sector a1 is configured, is marked as Ba1, and the BS device, with which other sectors are configured, are marked similarly, for instance, marking the BS device, with which sector a2 is configured, with Ba2, and the BS device, with which sector a3 is configured, with Ba3, and so on. Hereafter, in combination with FIG. 1a and FIG. 2, taking the sector a1 and the BS device Ba1 configured therewith as an example, the description for the first aspect of the present invention is made. It should be appreciated that, the sector division structure as shown in FIG. 1b may also be applicable.

Firstly, in step S1, BS device Ba1 determines a first sector cooperation group used by BS device Ba1 in a first frequency band, and the first sector cooperation group comprises the sector a1 and one or more adjacent sectors of the sector a1.

Figure 4A:
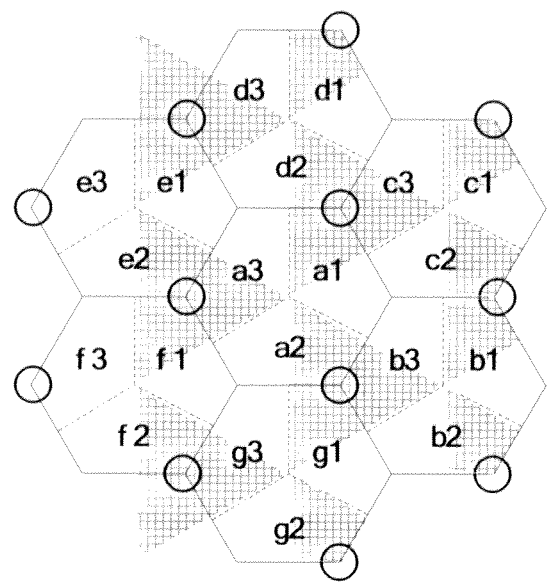
FIG. 4a illustrates a structure for sector grouping in a wireless communication system according to an embodiment of the present invention.

The first frequency band herein may comprise all frequency bands of the BS device Ba1, or comprise portion of frequency band(s) of the BS device Ba1 only. To be specific, sector cooperation group may be preset by system, and the BS device Ba1 determines the first sector cooperation group used by itself in the first frequency band according to preset of the system. According to one embodiment of the present invention, the sector cooperation group is preset within the system in accordance with sector-grouping structure as shown in FIG. 4. As shown in FIG. 4a, several adjacent sectors overlapping each circle constitutes respectively each sector group, for instance, sectors a1, c3, d2 constitute a sector group, sectors a2, g1, b3 constitute a sector group, sectors a3, e2, f1 constitute a sector group, and so forth. Each sector group is regarded, by preset in the system, as a sector cooperation group, wherein, the first sector cooperation group used by the BS device Ba1 in the first frequency band comprises sectors a1, c3, d2.

In step S2, the BS device with which the sector a1 configured implements MIMO transmission in the first frequency band, by cooperating with adjacent base station devices configured to one or more adjacent sectors of the first sector cooperation group, for a mobile station in signal overlapping coverage area of each sector of the first sector cooperation group.

Specifically, the first sector cooperation group, used by the BS device Ba1 in the first frequency band, comprises sectors a1, c3, d2. Then in the first frequency band, BS devices Ba1, Bc3, Bd2 jointly implement the MIMO transmission theramong only, through coordination. As shown in FIG. 4a, the grid-shadow area of sectors a1, c3, d2 represents signal overlapping coverage area of each sector of the first sector cooperation group.

Taking it for an example that the BS device Ba1 for one MS MS1 only, the MS MS1 is generally located in the sector a1. If MS MS1 is located in the signal overlapping coverage area of sectors a1, c3, d2, then the MS MS1 is most likely to suffer from the relatively strong interference from BS devices Bc3, Bd2. The BS device Ba1 may receive user interference report transmitted by the MS MS1 and get a judgment of an approximate orientation of the MS MS1 according to the user interference report. If the user interference report indicates that the interference power, received by the MS MS1, from BS devices Bc3, Bd2 is higher above the interference power from other BS devices, then it can be determined that the MS MS1 is located in the signal overlapping coverage area of sectors a1, c3, d2. If the user interference report indicates that the ratio of interference power received by the MS MS1, from the BS device Bc3 or Bd2 to signal power received by the MS MS1 from the BS device Ba1 is higher than a predetermined value, then the BS device Ba1 sends to the BS device Bc3 or Bd2 a request for implementing, in cooperation with the BS device Ba1, MIMO transmission from the MS MS1. If more than two BS devices are supported within the system to use the same time/frequency to serve for one MS simultaneously and the user interference report indicates that the ratio of interference power received by the MS MS1, from both device Bc3 and Bd2 to signal power received by the MS MS1 from the BS device Ba1 are all higher than a predetermined value, then the BS device Ba1 sends to the BS device Bc3 and Bd2 a request for implementing, in cooperation with the BS device Ba1, MIMO transmission for the MS MS1.

Taking it for an example that the BS device Bd2 serves for a MS MS2, the BS device Bc3 serves for a MS MS3. The MS MS2 and MS MS3 all receive relatively strong strong interference from the BS device Ba1. The BS device Bd2 requests the BS device Ba1 to implement, in cooperation with the BS device Bd2, MIMO transmission via time frequency T2F2 for the MS MS2. The BS device Bc3 requests the BS device Ba1 to implement, in cooperation with the BS device Bc3, MIMO transmission via time frequency T2F2 for the MS MS3. The BS device Ba1 judges whether to accept such requests according to its available service resource. For instance, in a MIMO system with each BS device (as a transmitting terminal) employed with 4 antennas, spatial degrees of freedom for each one BS device is 4, namely, maximum allowance of orthogonal-data-stream simultaneous transmission via the same time/frequency for the BS device is 4. If one user needs to receive 2 orthogonal datastreams, then one BS device can only serve simultaneously for two users via the same time/frequency; if one BS device has already been serving a user via some time/frequency and sends 2 orthogonal datastreams for the user, then remaining spatial degrees of freedom for the BS device via the time frequency is 2; if one BS device has already been serving two users via some time/frequency and sends 2 orthogonal datastreams respectively for each of the two user, then remaining spatial degrees of freedom for the BS device via the time/frequency is 0. If spatial degree of freedom for the BS device Ba1 via time/frequency T1F1 is used up, then the BS device Ba1 will reject the request from the BS device Bd2. If there is still enough margin spatial degrees of freedom for the BS device Ba1 via time/frequency T2F2, then the BS device Ba1 will accept those requests from the BS device Bc3, and utilize time/frequency T2F2 to implement, in cooperation with the BS device Bc3, MIMO transmission for the MS MS3.

It should be appreciated that, sector cooperation group may be set within the system according to other sector grouping structure, and the number of adjacent sectors may vary for different sector cooperation group. One sector cooperation group may comprise only two adjacent sectors, for instance the sector a1 and the sector b3.

According to one preferable embodiment of one aspect of the present invention, there is still a step S0 prior to step S1, S2 (not shown).

In step S0, the BS device Ba1 determines a plurality of sector groups, wherein each of the plurality of sector groups comprises the sector dominated by the base station device and one or more adjacent sectors of the sector.

Figure 4B:
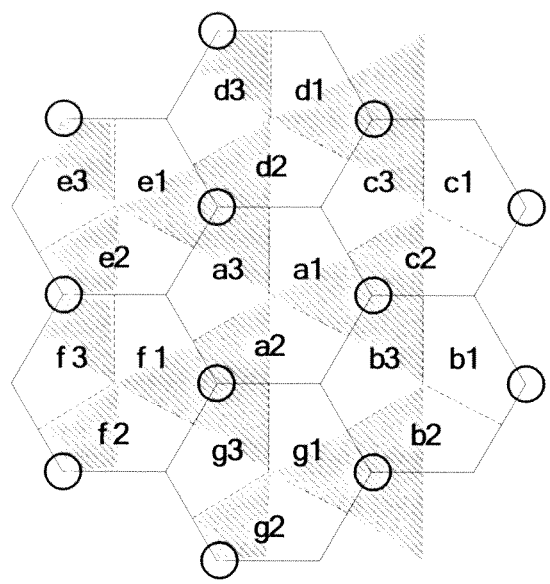
FIG. 4b illustrates a structure for sector grouping in a wireless communication system according to another embodiment of the present invention.
Figure 4C:
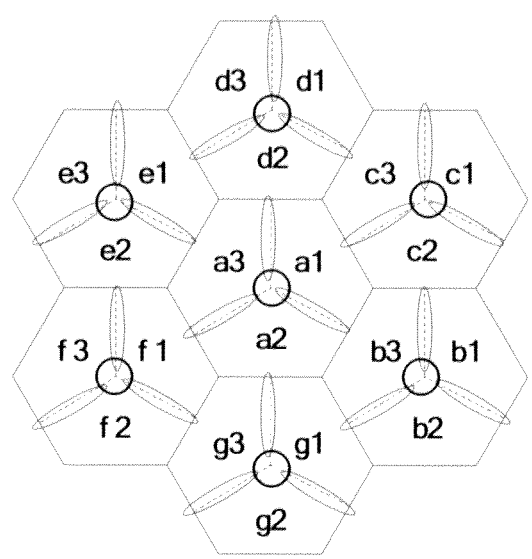
FIG. 4c illustrates a structure for sector grouping in a wireless communication system according to a further embodiment of the present invention.

Specifically the system may preset several fixed sector grouping structures, such as those sector grouping structures shown in FIG. 4a, 4b, 4c. As shown in FIG. 4a, several adjacent sectors, overlapping every circle, constitute each sector group, for instance, sectors a1, c3, d2 constitute a sector group, sectors a2, g1, b3 constitute a sector group, sectors a3, e2, f1 constitute a sector group, and so forth. As shown in FIG. 4b, several adjacent sectors, overlapping every circle, constitute each sector group, for instance, sectors a1, b3, c2 constitute a sector group, sectors a2, f1, g3 constitute a sector group, sectors a3, d2, e1 constitute a sector group, and so forth. As shown in FIG. 4c, several adjacent sectors within each cell constitute each sector group, for instance, sectors a1, a2, a3 constitute a sector group, sectors b1, b2, b3 constitute a sector group, and so forth. The BS device Ba1 determines, according to system settings, multiple sector groups with the sector a1 included respectively, for instance the sector group composed of sectors a1, c3, d2, the sector group composed of sectors a1, b3, c2, the sector group composed of sectors a1, a2, a3.

In step S1, in accordance with a predetermined rule, the BS device Ba1 selects a sector group from the plurality of sector groups, with the sector a1 included respectively, as the first sector cooperation group used by the BS device Ba1 in the first frequency band. Herein, the first frequency band may comprise all the available frequency bands of the BS device Ba1, or merely comprise a portion of frequency bands therein.

According to a preferable embodiment of the present invention, Time Division switch may occur to the first sector cooperation group adopted by each BS device in the first frequency band. It is set within the system that all the BS devices selects sector groups, within the same sector grouping structure, as the first sector cooperation group used respectively by the BS devices in the first frequency band. For instance, it may be set within the system that: in time period Ti, each BS device determines the first sector cooperation group used in the first frequency band by means of the sector group within the sector grouping structure as shown in FIG. 4a, namely, the first sector cooperation group used by the BS device Ba1 in the first frequency band comprises sectors a1, c3, d2, the first sector cooperation group used by the BS device Ba2 in the first frequency band comprises sectors a2, b3, g1, and so forth. Moreover, it may be set within the system that all those BS devices switch in multiple sector grouping structures by the same switch period so as to determine the first sector cooperation group respectively used in the first frequency band. For instance, it can be further set within the system that in time period Tii, each BS device use a sector group of the sector grouping structure as shown in FIG. 4b so as to determine the first sector cooperation group respectively used in the first frequency band; in time period Tiii, each BS device use a sector group within the sector grouping structure as shown in FIG. 4c so as to determine the first sector cooperation group respectively used in the first frequency band; and so forth.

Then, for the BS device Ba1, the predetermined rule comprises: according to the system settings, one of sector groups with the sector a1 included respectively therein is switched, by the BS device Ba1, to act as the first sector cooperation group used in the first frequency band. For instance, in time period Ti, the first sector cooperation group determined by the BS device Ba1 comprises sectors a1, c3, d2; in time period Tii, the first sector cooperation group determined by the BS device Ba1 comprises sectors a1, b3, c2; in time period Tiii, the first sector cooperation group determined by the BS device Ba1 comprises sectors a1, a2, a3, and so forth. Thus, there always exists an opportunity that the sector a1 conduct a multiple-sector cooperation MIMO transmission with all the sectors adjacent to the sector a1. As shown in FIG. 4b, the twilled-shadow area among sectors a1, b3, c2 represents signal overlapping coverage area of sectors a1, b3, c2. As shown in FIG. 4c, the elliptical area among sectors a1, a2, a3 represents signal overlapping coverage area of sectors a1, a2, a3.

In prior art, BS device may schedule the resource of the user equipments within its service area in the scheduling manner of polling, maximum ratio of carrier to interference (Max C/I) or proportional fairness. Wherein, the polling scheduling has a lowest total throughput and best fairness for users. The Max C/I scheduling has a highest total throughput and worst fairness for users, since users on the cell-edge receive relative weak signals along with relatively strong interference, and almost no resource allocation is accessible for these cell-edge users. The proportional fairness scheduling has a tradeoff between the total throughput and user fairness, and scheduling priority is elevated if the ratio of the resource requested by a user to the resource allocated for the user is too low.

Taking time period Tii as an example, the first sector operation group determined by the BS device Ba1 comprises sectors a1, b3, c2, namely, in time period Tii, BS devices Ba1, Bb3, Bc2 implements, merely by coordination thereamong, a joint MIMO transmission. To take it as an example that the BS device Ba1 serve the MS MS1, MS2, if the BS device Ba1 detects that the MS MS1 is in signal overlapping coverage area of sectors a1, b3, c2 while the MS MS2 is not in this signal overlapping coverage area, then the BS device Ba1 may elevate the scheduling priority of the MS MS1. For instance, the BS device Ba1 may have original scheduling priority of the MS MS1 multiplied by a relatively high weighting coefficient, while scheduling priority of the MS MS2 is multiplied by a relatively low weighting coefficient. In the other time periods, the BS device Ba1 may apply a similar processing to the MS in sector a1. For instance, in time period Ti, BS devices Ba1, Bc3, Bd2 implements, merely by coordination thereamong, a joint MIMO transmission, and the BS device Ba1 may elevate the scheduling priority of MS which is in its service area and also within signal overlapping coverage area of sectors a1, c3, d2.

It should be noted that, to ensure the fairness among users, duration of each time period may be configured appropriately within the system, and the each time period herein is the time period during which each sector grouping structure as shown in FIG. 4a, 4b, 4c is used as each time period of the first sector cooperation group used by each BS device in the first frequency band. As shown in FIG. 4a, 4b, 4c, the signal overlapping coverage area of sectors a1, c3, d2, the signal overlapping coverage area of sectors a1, b3, c2 is respectively larger than the signal overlapping coverage area of sectors a1, c3, d2, therefore, it may be set, within the system, that the duration of above time period Ti, Tii is bigger than the duration of time period Tiii.

It is a preferable embodiment for the system to be set with various sector grouping structures as shown in FIG. 4a, 4b, 4c. Wherein, the three sector groups, respectively with the sector a1 included, are the sector group composed of sectors a1, c3, d2, the sector group composed of sectors a1, b3, c2, the sector group composed of sectors a1, c3, d2. These three sector groups comprise all sectors adjacent to the sector a1, wherein the sectors adjacent to the sector a1 within each sector group are different from each other. In another embodiment, it may be set, within the system, that all the BS devices switch, with the same switching period, merely among the sector grouping structures as shown in FIG. 4a, 4b, so as to determine the respective first sector cooperation group used in the first frequency band. In another embodiment, those sector groups with the sector a1 included may be: the sector group composed of sectors a1, c3, d21; the sector group composed of sectors a1, c2, c3.

According to a variation of the preferable embodiment wherein the first sector cooperation group used by each BS device in the first frequency band may be switched in a time-division manner, the system further includes a central control device, and the central control device is used for notifying each BS device to switch their respective first sector cooperation group. The step S1 further comprises the following sub-steps. In one sub-step, the BS device Ba1 receives indication information of the first sector cooperation group from the central control device; the indication information of the first sector cooperation group is used for indicating the sectors that is included in the sector cooperation group used by BS device Ba1 in the first frequency band. In another sub-step, the BS device Ba1 determines, based on the indication information of the first sector cooperation group, the first sector cooperation group of itself. For instance, at the start of the time period Ti, the central control device notifies the BS device Ba1 of the information that the first sector cooperation group of itself comprises sectors a1, c3, d2, and notifies the BS device Ba2 of the information that the first sector cooperation group of itself comprises sectors a2, b3, g1, and so forth; at the start of time period Tii, such central control device notifies the BS device Ba1 of the information that the first sector cooperation group of itself comprises sectors a1, b3, c2, and notifies the BS device Ba2 of the information that the first sector cooperation group comprises sectors a2, g3, f1, and so forth; and so on.

According to another preferable embodiment of the present invention, each BS device may use different sector cooperation group for different frequency band.

In step S0, the BS device Ba1 determines a plurality of sector groups, wherein each of the plurality of sector groups comprises the sector dominated by the base station device and one or more adjacent sectors of the sector. Specifically, it may be preset, within the system, several fixed sector grouping structures, such as those sector grouping structures shown in FIG. 4a, 4b, 4c. The BS device Ba1 determines, according to system settings, multiple sector groups with the sector a1 included respectively, for instance the sector group composed of sectors a1, c3, d2, the sector group composed of sectors a1, b3, c2, the sector group composed of sectors a1, a2, a3.

In step S1, in accordance with a predetermined rule, the BS device Ba1 selects a sector group from the plurality of sector groups, with the sector a1 included respectively, as the first sector cooperation group used by the BS device Ba1 in the first frequency band. And it determines sector cooperation groups, used respectively on several other frequency bands, out of the plurality of sector groups with the sector a1 included respectively. Herein, the first frequency band merely comprises portion of frequency bands of the BS device Ba1. Preferably, the predetermined rule comprises: the sector cooperation group used respectively in the above frequency bands by BS device Ba1 is different from each other.

In Step 2, the BS device Ba1 implements MIMO transmission in any frequency band, by cooperating with adjacent base station devices configured to one or more adjacent sectors in the sector cooperation group used in such a frequency band, for a mobile station in signal overlapping coverage area of each sector of the sector cooperation group used in such a frequency band.

Specifically, it may be set within the system that all BS devices use, in the same frequency band, the sector group in the same one sector grouping structure as the sector cooperation group used respectively in such frequency band. For instance, it may be set, within the system, that: in frequency band Fi, each BS device utilizes the sector group in the sector grouping structure as shown in FIG. 4a to determine sector cooperation group used respectively in the frequency band, namely, the sector cooperation group used by the BS device Ba1 in frequency band Fi comprises sectors a1, c3, d2 the sector cooperation group used by the BS device Ba2 in frequency band Fi comprises sectors a2, b3, g1, and so forth; in frequency band Fii, each BS device utilizes the sector group in the sector grouping structure as shown in FIG. 4b to determine the sector cooperation group used in the frequency band, namely, the sector cooperation group used by the BS device Ba1 in frequency band Fii comprises sectors a1, b3, c2, the sector cooperation group used by the BS device Ba2 in frequency band Fii comprises sectors a2, g3, f1, and so forth.

It is a preferred embodiment for the system to be configured with different sector grouping structures as shown in FIG. 4a, 4b, 4c. Wherein, the three sector groups, respectively with the sector a1 included, are the sector group composed of sectors a1, c3, d2, the sector group composed of sectors a1, b3, c2, the sector group composed of sectors a1, c3, d2. These three sector groups comprise all sectors adjacent to the sector a1, wherein the sectors adjacent to the sector a1 within each sector group are different from each other. In another one embodiment, it may just be set for the system to be configured with the sector grouping structure as shown in FIG. 4a, 4b, and all the BS devices adopt merely one of all those sector grouping structures in the same frequency band as the sector cooperation group used respectively in such frequency band. In another one embodiment, the sector groups, respectively with the sector a1 included, may be the sector group composed of sectors a1, c3, d2, the sector group composed of sectors a1, c2, c3.

Figure 3:
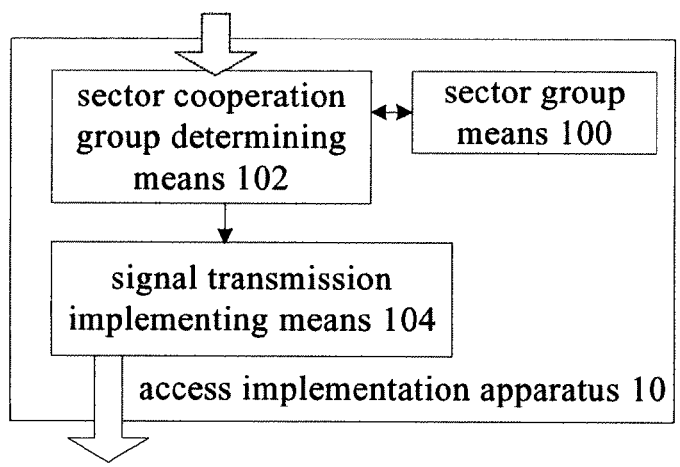
FIG. 3 illustrates the block diagram of an access implementation apparatus for implementing MIMO transmission to a MS in a base station device of a wireless communication system according to an embodiment of the present invention.

According to second aspect of the present invention, there is provided an access implementation apparatus for implementing MIMO transmission to a MS in a base station device of a wireless communication system. FIG. 3 illustrates the block diagram of an access implementation apparatus for implementing MIMO transmission to a MS in a base station device of a wireless communication system according to an embodiment of the present invention. As shown in FIG. 3, the access implementation apparatus 10 comprises a sector grouping means 100, a sector cooperation group determining means 102 and a signal transmission implementing means 104. According to various embodiments of the present intention, the access implementation apparatus 10 comprises portion of or all of the above means and other possible means.

According to one embodiment of the present invention, wireless communication system adopts a sector division structure as shown in FIG. 1a. Every cell comprises three sectors, and every sector is configured respectively with a BS device. For a convenient explanation, BS device, with which sector a1 is configured, is marked as Ba1, and the BS device, with which other sectors are configured, are marked similarly, for instance, marking the BS device, with which sector a2 is configured, with Ba2, and the BS device, with which sector a3 is configured, with Ba3, and so on. The access implementation apparatus 10 is typically configured within each BS device. Hereafter, in combination with FIG. 1a and FIG. 2, taking the sector a1 and the BS device Ba1 configured therewith and the access implementation apparatus 10 in the BS device Ba1 as an example, the description for the second aspect of the present invention is made.

According to one embodiment of the present invention, the access implementation apparatus 10 comprises the sector cooperation group determining means 102 and the signal transmission implementing means 104.

Firstly, for the BS device Ba1, the sector cooperation group determining means 102 therein determines the first sector cooperation group used in a first frequency band, and the first sector cooperation group comprises the sector a1 and one or more sectors adjacent to the sector a1.

The first frequency band herein may comprise all frequency bands of the BS device Ba1, or portion of frequency band(s) of the BS device Ba1 only. To be specific, sector cooperation group may be preset by system, and sector cooperation group determining means 102 of the BS device Ba1 determines the first sector cooperation group used by the BS device Ba1 in the first frequency band according to preset of the system. According to one embodiment of the present invention, the sector cooperation group is preset within the system in accordance with sector grouping structure as shown in FIG. 4a. As shown in FIG. 4a, several adjacent sectors overlapping each circle constitutes respectively each sector group, for instance, sectors a1, c3, d2 constitute a sector group, sectors a2, g1, b3 constitute a sector group, sectors a3, e2, f1 constitute a sector group, and so forth. Each sector group is regarded, by presetting in the system as a sector cooperation group, wherein, the first sector cooperation group used by the BS device Ba1 in the first frequency band, comprises sector a1, c3, d2.

Secondly, for the BS device Ba1, the signal transmission implementing means 104 therein, implements MIMO transmission in the first frequency band, by cooperating with adjacent base station devices configured to one or more adjacent sectors of the first sector cooperation group, for a mobile station in signal overlapping coverage area of each sector of the first sector cooperation group.

Specifically, the first sector cooperation group used by the BS device Ba1 in the first frequency band comprise sectors a1, c3, d2. Then, in the first frequency band, BS devices Ba1, Bc3, Bd2 implements, merely by coordination thereamong, a joint MIMO transmission in the first frequency band. As shown in FIG. 4a, the grid-shadow area of sectors a1, c3, d2 represents signal overlapping coverage area of each sector of the first sector cooperation group.

Taking it for an example that the BS device Ba1 for one MS MS1 only, the MS MS1 is generally located in the sector a1. If MS MS1 is located in the signal overlapping coverage area of sectors a1, c3, d2, then the MS MS1 is most likely to suffer from the relatively strong interference from BS devices Bc3, Bd2. For the BS device Ba1, the signal transmission implementing means 104 therein may receive user interference report transmitted by the MS MS1 and get a judgment of an approximate orientation of the MS MS1 according to the user interference report. If the user interference report indicates that the interference power, received by the MS MS1, from BS devices Bc3, Bd2 is higher above the interference power from other BS devices, then it can be determined that the MS MS1 is located in the signal overlapping coverage area of sectors a1, c3, d2. If the user interference report indicates that the ratio of interference power received by the MS MS1, from the BS device Bc3 or Bd2 to signal power received by the MS MS1 from the BS device Ba1 is higher than a predetermined value, then within the BS device Ba1, its signal transmission implementing means 104 sends to the BS device Bc3 or Bd2 a request for implementing, in cooperation with the BS device Ba1, MIMO transmission for the MS MS1. If more than two BS devices is supported within the system to use the same time/frequency to serve for one MS simultaneously and the user interference report indicates that the ratio of interference power received by the MS MS1, from both BS device Bc3 and Bd2 to signal power received by the MS MS1 from the BS device Ba1 are all higher than a predetermined value, then the BS device Ba1 sends to the BS device Bc3 and Bd2 a request for implementing, in cooperation with the BS device Ba1 MIMO transmission for the MS MS1.

Taking it for an example that the BS device Bd2 serves for a MS MS2, the BS device Bc3 serve for a MS MS3. The MS MS2 and MS MS3 all receive relatively strong strong interference from the BS device Ba1. The BS device Bd2 requests the BS device Ba1 to implement, in cooperation with the BS device Bd2, MIMO transmission via time/frequency T2F2 for the MS MS2. The BS device Bc3 requests the BS device Ba1 to implement, in cooperation with the BS device Bc3, MIMO transmission via time frequency T2F2 for the MS MS3. The BS device Ba1 judges whether to accept such requests according to its available service resource. For instance, in a MIMO system with each BS device (as a transmitting terminal) employed with 4 antennas, spatial degrees of freedom for each one BS device is 4, namely, maximum allowance of orthogonal-data-stream simultaneous transmission via the same time/frequency for the BS device is 4. If one user needs to receive 2 orthogonal datastreams, then one BS device can only serve simultaneously for two users via the same time/frequency; if one BS device has already been serving a user via some time/frequency and sends 2 orthogonal datastreams for the user, then remaining spatial degrees of freedom for the BS device via the time/frequency is 2 if one BS device has already been serving two users via some time/frequency and sends 2 orthogonal datastreams respectively for each of the two user, then remaining spatial degrees of freedom for the BS device via the time/frequency is 0. If spatial degree of freedom for the BS device Ba1 via time/frequency T1F1 is used up, then the signal transmission implementing means 104 therein will reject the request from the BS device Bd2. If there is still enough margin spatial degrees of freedom for the BS device Ba1 via time frequency T2F2, then the signal transmission implementing means 104 therein will accept those requests from the BS device Bc3, and utilize time/frequency T2F2 implement, in cooperation with the BS device Bc3, MIMO transmission for the MS MS3.

It should be appreciated that, sector cooperation group may be set within the system according to other sector grouping structure(s), and the number of adjacent sectors may vary for different sector cooperation group. One sector cooperation group may comprise only two adjacent sectors, for instance the sector a1 and the sector b3.

According to one preferred embodiment of the first aspect of the present invention, the access implementation apparatus 10 comprises the sector grouping means 100, the sector cooperation group determining means 102 and the signal transmission implementing means 104.

Firstly, within BS device Ba1, the sector group means 100 therein determines a plurality of sector groups, wherein each of the plurality of sector groups comprises the sector dominated by the base station device and one or more adjacent sectors of the sector;

Specifically, the system may preset several fixed sector groping structures, such as those sector grouping structures shown in FIG. 4a, 4b, 4c. As shown in FIG. 4a, several adjacent sectors, overlapping every circle, constitute each sector group, for instance, sectors a1, c3, d2 constitute a sector group sectors a2, g1, b3 constitute a sector group, sectors a3, e2, f1 constitute a sector group, and so forth. As shown in FIG. 4b, several adjacent sectors, overlapping every circle, constitute each sector group, for instance, sectors a1, b3, c2 constitute a sector group, sectors a2, f1, g3 constitute a sector group, sectors a3, d2, e1 constitute a sector group, and so forth. As shown in FIG. 4c, several adjacent sectors within each cell constitute each sector group, for instance, sector a1, a2, a3 constitute a sector group sector b1, b2, b3 constitute a sector group, and so forth. Within the BS device Ba1, the sector grouping means 100 therein determines, according to system settings, multiple sector groups with sector a1 included respectively, for instance the sector group composed of sectors a1, c3, d2, the sector group composed of sectors a1, b3, c2, the sector group composed of sectors a1, a2, a3.

Then, in accordance with a predetermined rule, the sector cooperation group determining means 102 of the BS device Ba1 selects a sector group from the plurality of sector groups, with the sector a1 included respectively, as the first sector cooperation group used by the BS device Ba1 in the first frequency band. Herein, the first frequency band may comprise all the available frequency bands of the BS device Ba1, or merely comprise a portion of frequency band therein.

Then, within BS Ba1, signal transmission implementing means 104 therein implements MIMO transmission in said first frequency band, by cooperating with adjacent base station devices configured to said one or more adjacent sectors of said first sector cooperation group, for a mobile station in signal overlapping coverage area of each sector of said first sector cooperation group.

According to a preferable embodiment of the present invention, Time Division switch may occur to the first sector cooperation group adopted by each BS device in the first frequency band. It is set within the system that all the BS devices selects sector groups, within the same sector grouping structure, as the first sector cooperation group used respectively by the BS devices in the first frequency band. For instance, it may be set within the system that: in time period Ti, each BS device determines the first sector cooperation group used in the first frequency band by means of the sector group within the sector grouping structure as shown in FIG. 4a, namely, the first sector cooperation group used by the BS device Ba1 in the first frequency band comprises sectors, a1, c3, d2, the first sector cooperation group used by the BS device Ba2 in the first frequency and comprises sectors a2, b3, g1, and so forth. Moreover it may be set within the system that all those BS devices switch in multiple sector grouping structures by the same switch period so as to determine the first sector cooperation group respectively used in the first frequency band. For instance, it can be further set within the system that in time period Tii, each BS device use a sector group of the sector grouping structure as shown in FIG. 4b, so as to determine the first sector cooperation group respectively used in the first frequency band; in time period Tiii, each BS device use a sector group within the sector grouping structure as shown in FIG. 4c so as to determine the first sector cooperation group respectively used in the first frequency band; and so forth.

Then, for the BS device Ba1, the predetermined rule for the sector cooperation group determining means 102 comprises: according to the system settings, one of sector groups with the sector a1 included respectively therein is switched to act as the first sector cooperation group used by the BS device Ba1 in the first frequency band. For instance, in time period Ti, the first sector cooperation group used by the BS device Ba1 comprises sectors a1, c3, d2; in time period Tii, the first sector cooperation group used by the BS device Ba1 comprises sectors a1, b3, c2; in time period Tiii, the first sector cooperation group used by the BS device Ba1 comprises sectors a1, a2, a3, and so forth. Thus, there always exists an opportunity that the sector a1 conduct a multiple-sector cooperation MIMO transmission with all the sectors adjacent to the sector a1. As shown in FIG. 4b, the twilled-shadow area among sector a1, b3, c2 represents signal overlapping coverage area of sectors a1, b3, c2. As shown in FIG. 4c, the elliptical area among sectors a1, a2, a3 represents signal overlapping coverage area of sectors a1, a2, a3.

In prior art, BS device may schedule the resource of the user equipments within its service area in the scheduling manner of polling, maximum ratio of carrier to interference (Max C/I) or proportional fairness. Wherein, the polling scheduling has a lowest total throughput and best fairness for users. The Max C/I scheduling has a highest total throughput and worst fairness for users, since users on the cell-edge receives relative weak signals along with relatively strong interference, and almost no resource allocation is accessible for these cell-edge users. The proportional fairness scheduling has a tradeoff between the total throughput and user fairness, and scheduling priority is elevated if the ratio of the resource requested by a user to the resource allocated for the user is too low.

Taking time period Tii as an example, the first sector cooperation group, determined by the sector cooperation group determining means 102 of the BS device Ba1, comprise sectors a1, b3, c2, namely, in time period Tii, BS devices Ba1, Bb3, Bc2 implements, merely by coordination thereamong, a joint MIMO transmission. To take it as an example that the BS device Ba1 serve for the MS MS1, MS2 if the BS device Ba1 detects that the MS MS1 is in signal overlapping coverage area of sectors a1, b3, c2 while the MS MS2 is not in this signal overlapping coverage area, then for the BS device Ba1, the signal transmission implementing means 104 thereof may elevate the scheduling priority of the MS MS1. For instance, BS device Ba1 may have original scheduling priority of the MS MS1 multiplied by a relatively high weighting coefficient, while scheduling priority of the MS MS2 is multiplied by a relatively low weighting coefficient. In the other time period, the BS device Ba1 may apply a similar processing to the MS in sector a1. For instance, in time period Ti, BS devices Ba1, Bc3, Bd2 implements, merely by coordination thereamong, a joint MIMO transmission, and the signal transmission implementing means 104 of BS device Ba1 may elevate the scheduling priority of MS which is in its service area and also within signal overlapping coverage area of sectors a1, c3, d2.

It should be noted that, to ensure the fairness among users, duration of each time period may be configured appropriately within the system, and the each time period herein is the time period during which each sector grouping structure as shown in FIG. 4a, 4b, 4c is used as each time period of the first sector cooperation group used by each BS device in the first frequency band. As shown in FIG. 4a, 4b, 4c, the signal overlapping coverage area of sector a1, c3, d2, the signal overlapping coverage area of sectors a1, b3, c2 is respectively larger than the signal overlapping coverage area of sectors a1, c3, d2, therefore, it may be set, within the system, that the duration of above time period Ti, Tii is bigger than the duration of time period Tiii.

It is a preferable embodiment for the system to be set with various sector grouping structures as shown in FIG. 4a, 4b, 4c. Wherein, the three sector groups, respectively with the sector a1 included, are the sector group composed of sectors a1, c3, d2, the sector group composed of sectors a1, b3, c2, the sector group composed of sectors a1, c3, d2. These three sector groups comprise all sectors adjacent to the sector a1, wherein the sectors adjacent to the sector a1 within each sector group are different from each other. In another embodiment, it may be set, within the system, that all the BS devices switch, with the same switching period, merely among the sector grouping structures as shown in FIG. 4a, 4b, so as to determine the respective first sector cooperation group used in the first frequency band. In another embodiment, those sector groups with the sector a1 included may be: the sector group composed of sectors a1, c3, d21; the sector group composed of sectors a1, c2, c3.

According to a variation of the preferable embodiment wherein the first sector cooperation group used by each BS device in the first frequency band may be switched in a time-division manner, the system further includes a central control device, and the central control device is used for notifying each BS device to switch their respective first sector cooperation group. The sector cooperation group determining means 102 is further configured to perform the following sub-processings. During one sub-processing, the sector cooperation group determining means 102 of the BS device Ba1 receives indication information of the first sector cooperation group from central control device, the indication information of the first sector cooperation group is used for indicating the sectors which is included in the sector cooperation group used by BS device Ba1 in the first frequency band. In another sub-processing, the sector cooperation group determining means 102 determines, based on the indication information of the first sector cooperation group, the first sector cooperation group of itself. For instance, at the start of the time period Ti, the central control device notifies the BS device Ba1 of the information that the first sector cooperation group of itself comprises sectors a1, c3, d2, and notifies the BS device Ba2 of the information that the first sector cooperation group of itself comprises sectors a2, b3, g1, and so forth; at the start of time period Tii, such central control device notifies the BS device Ba1 of the information that the first sector cooperation group of itself comprises sectors a1, b3, c2, and notifies the BS device Ba2 of the information that the first sector cooperation group comprises sectors a2, g3, f1, and so forth; and so on.

According to another preferable embodiment of the present invention, each BS device may use different sector cooperation group for different frequency band.

Firstly, the sector grouping means 100 of BS device Ba1 determines a plurality of sector groups, wherein each of the plurality of sector groups comprises the sector dominated by the base station device and one or more adjacent sectors of the sector. Specifically, it may be preset, within the system, several fixed sector grouping structures, such as those sector grouping structures shown in FIG. 4a, 4b, 4c. The BS sector grouping means 100 of the BS device Ba1 determines, according to system settings, multiple sector groups with sector a1 included respectively, for instance the sector group composed of sectors a1, c3, d2, the sector group composed of sectors a1, b3, c2, the sector group composed of sectors a1, a2, a3.

Then, in accordance with a predetermined rule, the sector cooperation group determining means 102 of the BS device Ba1 selects a sector group from the plurality of sector groups, with the sector a1 included respectively, as the first sector cooperation group used by the BS device Ba1 in the first frequency band. And it determines sector cooperation groups, used respectively on several other frequency bands out of the plurality of sector groups with the sector a1 included respectively. Herein, the first frequency band merely comprises portion of frequency bands of the BS device Ba1. Preferably, the predetermined rule comprises: the sector cooperation group used respectively in the above frequency bands by BS device Ba1 is different from each other.

Then, for BS device Ba1, the signal transmission implementing means 104 implements MIMO transmission in any frequency band, by cooperating with adjacent base station devices configured to one or more adjacent sectors in the first sector cooperation group used in such a frequency band, for a mobile station in signal overlapping coverage area of each sector of the sector cooperation group used in such a frequency band.

Specifically, it may be set within the system that all BS devices use, in the same frequency band, the sector group in the same one sector grouping structure as the sector cooperation group used respectively in such frequency band. Sector cooperation group determining means 102 of each BS device determines, according to system settings, the sector cooperation group used by such BS device in every frequency band. For instance, it may be set, within the system, that: in frequency band Fi, each BS device utilizes the sector group in the sector grouping structure as shown in FIG. 4a to determine sector cooperation group used respectively in the frequency band, namely, the sector cooperation group used by the BS device Ba1 in frequency band Fi comprises sectors a1, c3, d2, the sector cooperation group used by the BS device Ba2 in frequency band Fi comprises sectors a2, b3, g1, and so forth; in frequency band Fii, each BS device utilizes the sector group in the sector grouping structure as shown in FIG. 4b to determine the sector cooperation group used in the frequency band, namely, the sector cooperation group used by the BS device Ba1 in frequency band Fii comprises sectors a1, b3, c2, the sector cooperation group used by the BS device Ba2 in frequency band Fii comprises sectors a2, g3, f1, and so forth.

It is a preferred embodiment for the system to be configured with different sector grouping structure as shown in FIG. 4a, 4b, 4c. Wherein, the three sector groups, respectively with the sector a1 included, are the sector group composed of sectors a1, c3, d2, the sector group composed of sectors a1, b3, c2, the sector group composed of sectors a1, c3, d2. These three sector groups comprise all sectors adjacent to the sector a1, wherein the sectors adjacent to the sector a1 within each sector group are different from each other. In another one embodiment, it may just be set for the system to be configured with the sector grouping structure as shown in FIG. 4a, 4b, and all the BS device adopt merely one of all those sector grouping structures in the same frequency band as the sector cooperation group used respectively in such frequency band. In another one embodiment, the sector groups, respectively with the sector a1 included, may be the sector group composed of sectors a1, c3, d2 the sector group composed of sectors a1, c2, c3.

The non-limited embodiments of the present invention have been described above. However, the present invention is not limited to particular system, device and specific protocol, and various modifications or amendments can be made without departing from the scope and spirit of the scope of the attached claims by those skilled in the art.

What is claimed is:

1. A method for implementing MIMO transmission in a base station device of a wireless communication system, wherein each cell of said wireless communication system comprises at least one sector, each of which is configured with one base station device, the method comprising:
   a. determining a first sector cooperation group used by said base station device in a first frequency band, wherein said first sector cooperation group comprises the sector dominated by said base station device and one or more adjacent sectors of said sector;

b. implementing MIMO transmission in said first frequency band, by:

cooperating with adjacent base station devices configured to said one or more adjacent sectors of said first sector cooperation group, for a mobile station in signal overlapping coverage area of each sector of said first sector cooperation group;

receiving a user interference report from a mobile station, in signal overlapping coverage area of each sector of said first sector cooperation group, served by said base station device, and if said user interference report indicates that the ratio of interference power of said one or more sectors in said first sector cooperation group received by said mobile station to signal power received by said mobile station from said base station device is higher than a predetermined value, sending a request to said adjacent base station devices configured to said one or more adjacent sectors, for requesting cooperation with said base station device to implement MIMO transmission for said mobile station.

2. A method as claimed in claim 1, further comprising a step of:

determining a plurality of sector groups, wherein each of said plurality of sector groups comprises said sector dominated by said base station device and said one or more adjacent sectors of said sector;

said step a further comprises:

selecting a sector group from said plurality of sector groups as said first sector cooperation group used by said base station device in said first frequency band, in accordance with a predetermined rule.

3. A method as claimed in claim 2, wherein said predetermined rule comprises:

selecting the first sector cooperation group from said plurality of sector groups in turn.

4. A method as claimed in claim 3, wherein any adjacent sector in one of said plurality of sector groups is different from any adjacent sector in other of said plurality of sector groups.

5. A method as claimed in claim 4, wherein all adjacent sectors in said plurality of sector groups comprises all adjacent sectors of sector dominated by said base station device.

6. A method as claimed in claim 2, wherein said first frequency band comprises a portion of frequency bands of said base station device;

said step a further comprises:

determining respective sector cooperation groups for one or more other frequency bands from said plurality of sector groups, in accordance with said predetermined rule.

7. A method as claimed in claim 6, wherein said step b further comprises:

implementing MIMO transmission, in any frequency band of said one or more other frequency bands, by cooperating with adjacent base station devices configured to one or more adjacent sectors in said sector cooperation group used in said any frequency band, for a mobile station in signal overlapping coverage area of each sector of said sector cooperation group used in said any frequency band.

8. A method as claimed in claim 6, wherein said predetermined rule comprises:

sector cooperation groups used in said first frequency band and used in said one or more other frequency bands are different from each other.

9. A method as claimed in claim 1, wherein said step a further comprises:

receiving indication information of said first sector cooperation group from a central control device, wherein said indication information is used for indicating sectors which are comprised in said first sector cooperation group, to which said sector dominated by said base station device belongs; and determining said first sector cooperation group, in accordance with said indication information.

10. A method as claimed in claim 1, wherein said step b further comprises:

receiving, from an adjacent base station device configured to an adjacent sector in said first sector cooperation group, a request for requesting cooperation with said base station device to implement MIMO transmission for a mobile station; and judging whether said request should be accepted, in accordance with available service resource of said base station device; and if said request is accepted, implementing MIMO transmission for said mobile station by cooperating with said adjacent base station device.

11. A method as claimed in claim 1, wherein said first frequency band comprises all frequency bands of said base station device.

12. An access implementation apparatus for implementing MIMO transmission to a MS in a base station device of a wireless communication system, wherein each cell of said wireless communication system comprises at least one sector, each of which is configured with one said base station device, the access implementation apparatus comprising:

a sector cooperation group determining component of the base station operative to determine a first sector cooperation group used by said base station device in a first frequency band, wherein said first sector cooperation group comprises the sector dominated by said base station device and one or more adjacent sectors of said sector;

a transmitter operative to implement MIMO transmission in said first frequency band, by cooperating with adjacent base station devices configured to said one or more adjacent sectors of said first sector cooperation group, for a mobile station in signal overlapping coverage area of each sector of said first sector cooperation group;

wherein the base station device is operative to receive a user interference report from a mobile station, in signal overlapping coverage area of each sector of said first sector cooperation group, served by said base station device, and wherein the base station device is operative if said user interference report indicates that the ratio of interference power of said one or more sectors in said first sector cooperation group received by said mobile station to signal power received by said mobile station from said base station device is higher than a predetermined value, to send a request to said adjacent base station devices configured to said one or more adjacent sectors, for requesting cooperation with said base station device to implement MIMO transmission for said mobile station.

13. An access implementation apparatus as claimed in claim 12, further comprising:

a sector grouping component of the base station operative to determine a plurality of sector groups, wherein each of said plurality of sector groups comprises said sector dominated by said base station device and said one or more adjacent sectors of said sector;

wherein said sector cooperation group determining component is further operative to select a sector group from said plurality of sector groups as said first sector cooperation group used by said base station device in said first frequency band, in accordance with a predetermined rule.

14. An access implementation apparatus as claimed in claim 12, wherein said sector cooperation group determining component is further operative to:

receive indication information of said first sector cooperation group from a central control device, wherein said indication information is used for indicating sectors which are comprised in said first sector cooperation group, to which said sector dominated by said base station device belongs; and determine said first sector cooperation group, in accordance with said indication information.

15. A method for implementing MIMO transmission in a base station device of a wireless communication system, wherein each cell of said wireless communication system comprises at least one sector, each of which is configured with one base station device, the method comprising:

determining a plurality of sector groupings, wherein each of said plurality of sector groupings comprises said sector dominated by said base station device and said one or more adjacent sectors of said sector;

selecting a sector grouping from said plurality of sector groupings as a first sector cooperation group in accordance with a predetermined rule, wherein said first sector cooperation group comprises the sector dominated by said base station device and one or more adjacent sectors of said sector;

receiving, from an adjacent base station device configured to an adjacent sector in said first sector cooperation group, a request for requesting cooperation with said base station device to implement MIMO transmission for a mobile station;

judging whether said request should be accepted, in accordance with available service resource of said base station device; and if said request is accepted, implementing MIMO transmission in said first frequency band, by cooperating with adjacent base station devices configured to said one or more adjacent sectors of said first sector cooperation group, for said mobile station in signal overlapping coverage area of each sector of said first sector cooperation group.

16. A method as claimed in claim 15, wherein said predetermined rule comprises:

selecting the first sector cooperation group from said plurality of sector groups in turn.

17. A method as claimed in claim 16, wherein any adjacent sector in one of said plurality of sector groups is different from any adjacent sector in other of said plurality of sector groups.

18. A method as claimed in claim 17, wherein all adjacent sectors in said plurality of sector groups comprises all adjacent sectors of said sector dominated by said base station device.

19. A method as claimed in claim 15, wherein said step a further comprises:

receiving indication information of said first sector cooperation group from a central control device, wherein said indication information is used for indicating sectors which are comprised in said first sector cooperation group, to which said sector dominated by said base station device belongs; and determining said first sector cooperation group, in accordance with said indication information.

20. A method as claimed in claim 19, wherein said step b further comprises:

receiving, from an adjacent base station device configured to an adjacent sector in said first sector cooperation group, a request for requesting cooperation with said base station device to implement MIMO transmission for a mobile station; and judging whether said request should be accepted, in accordance with available service resource of said base station device; and if said request is accepted, implementing MIMO transmission for said mobile station by cooperating with said adjacent base station device.

* * * * *